United States Patent [19]

Roberts

[11] Patent Number: 4,802,450
[45] Date of Patent: Feb. 7, 1989

[54] BALANCER FOR INTERNAL COMBUSTION ENGINE

[75] Inventor: John M. L. Roberts, Coventry, United Kingdom

[73] Assignee: Triumph Motorcycles (Coventry) Limited, Hinckley, United Kingdom

[21] Appl. No.: 17,264

[22] Filed: Feb. 20, 1987

[30] Foreign Application Priority Data

Feb. 22, 1986 [GB] United Kingdom ............. 8604457

[51] Int. Cl.$^4$ .................. F02B 75/06; F16F 15/26
[52] U.S. Cl. .................. 123/192 B; 74/392; 74/604
[58] Field of Search .............. 123/192 R, 192 B; 74/392, 397, 604

[56] References Cited

U.S. PATENT DOCUMENTS

| | | | |
|---|---|---|---|
| 2,507,555 | 5/1950 | Berthiez | 74/397 |
| 2,526,964 | 10/1950 | Muller | 74/397 |
| 4,425,821 | 1/1984 | West | 74/604 |
| 4,509,378 | 4/1985 | Brown | 74/44 |

FOREIGN PATENT DOCUMENTS

| | | |
|---|---|---|
| 1188364 | 3/1965 | Fed. Rep. of Germany ... 123/192 B |
| 2916181 | 10/1980 | Fed. Rep. of Germany . |
| 2091814 | 8/1982 | United Kingdom . |
| 2146388 | 4/1985 | United Kingdom . |

Primary Examiner—Samuel Scott
Assistant Examiner—Allen J. Flanigan
Attorney, Agent, or Firm—Gifford, Groh, Sheridan, Sprinkle, and Dolgorukov

[57] ABSTRACT

A balancing arrangement is provided for balancing the secondary out of balance forces of four cylinder in line engines. A gearwheel carried on the crankshaft transmits drive to a further gearwheel and each of the gearwheels is arranged to drive a balancing wheel. The balancing wheels are driven in opposite directions at twice the rotational speed of the engine. Each wheel is provided with adjustment means whereby backlash in the wheels is taken up. The arrangement is of particular application to motorcycles.

5 Claims, 2 Drawing Sheets

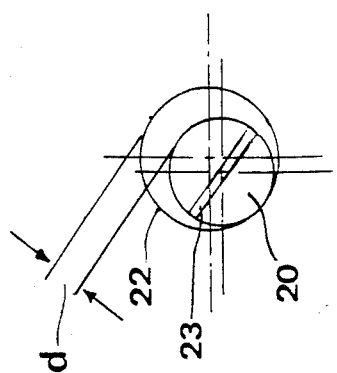
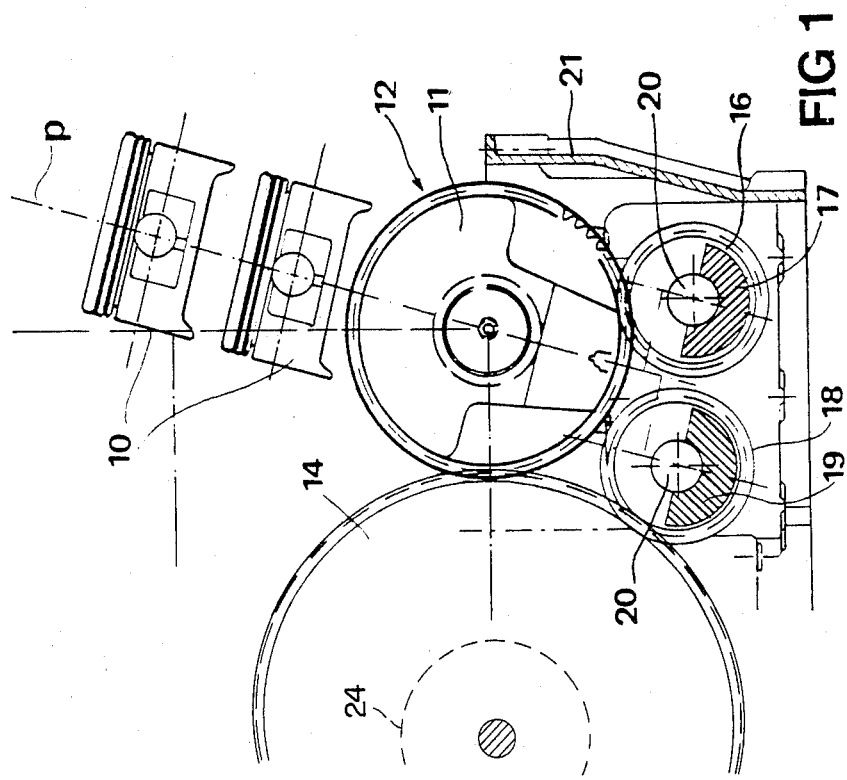

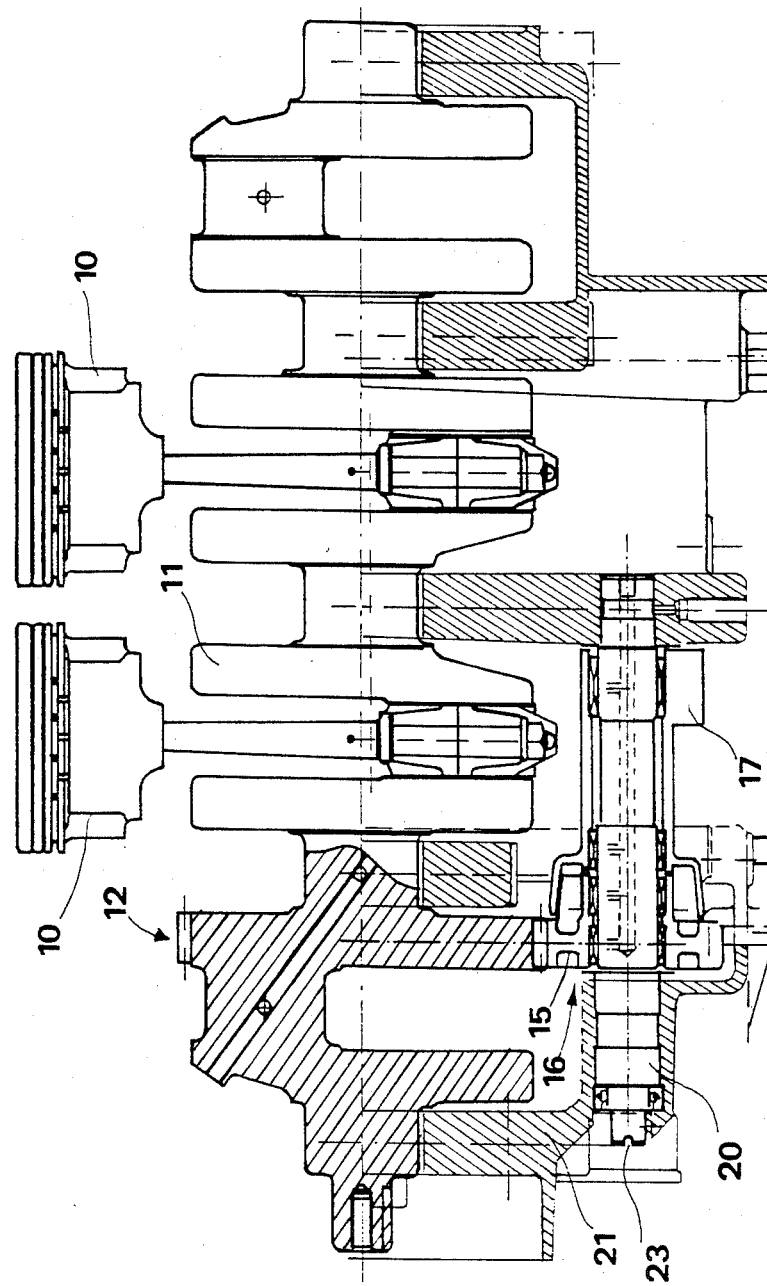

BALANCER FOR INTERNAL COMBUSTION ENGINE

This invention relates to a balancing arrangement for internal combustion engines and, in particular, a balancing arrangement for achieving balance of the secondary forces generated in such engines.

Balancing arrangements for internal combustion engines having four in line cylinders are known in which the secondary forces are substantially balanced. One such arrangement is known as the Lanchester balancer and various systems based on the Lanchester balancer have been proposed for four in line cylinder engines for cars and other automobiles, which substantially wholly balance the secondary forces. However in applying such systems to engines for motorcycles difficulties have arisen because of high rotational speeds of motorcycle engines. Accordingly compromise arrangements have been employed in motorcycles which merely reduce the secondary forces and do not always have the capability of substantially eliminating the secondary forces.

Balancing arrangements for single and twin cylinder engines have been proposed in which a pair of meshing gears each carrying balance weights are driven from the crankshaft via an intermediate gear, as for example in GB Patent Specifications No. 2091814A and No. 1250729.

GB Pat. No. 2146388A also describes a balancing system for single and twin cylinder engines but in this case one balancer is driven from the crankshaft through an intermediate gear wheel and the other, counterrotating balancer is driven through a series of intermediate gears from the crankshaft.

In a further proposal for in-line four cylinder engines, described in GB Pat. No. 1,496050, balancers are driven at twice engine speed and in opposite directions. The balancers are arranged at opposite sides of the plane of the crankshaft and cylinders but in order to drive the balancers a belt driven from the crankshaft is used.

An object of the invention is to provide a balancer for internal combustion engines, of particular application to motorcycles, which is capable of improving the balancing action and of bringing about an economical arrangement.

According to the invention an internal combustion engine comprises in line pistons and associated cylinders, a crankshaft driven by reciprocation of the pistons in the cylinders, a first gearwheel mounted for rotation with the crankshaft, a second gearwheel in driving engagement with the first gearwheel, a first balancing wheel driven by the first gearwheel and a second balancing wheel driven by the second gearwheel, whereby the balancing wheels are rotated in opposite directions at twice the rotational speed of the crankshaft about axes parallel to the crankshaft axis, thereby to balance secondary forces generated by the engine.

In practice the balancing wheels are normally in mesh with the respective gearwheels so that the balancing wheels carry half the number of teeth of the first gearwheel.

The balancing wheels generally include balance weights offset from the axis of rotation of the wheels and of a size to balance out the secondary forces generated by the engine including the pistons and connecting rods and crankshaft.

Conveniently the first and second balancing wheels are mounted for adjustment of the distance between the axis of the respective balancing wheel and the axis of the associated gearwheel.

Preferably the balancing wheels are each carried on a fixed spindle and, located between the spindle and the wheel, a bearing member for the wheel is eccentrically-arranged so that its position can be adjusted about the spindle to vary the distance between the axis of rotation of the balancing wheel and the axis of rotation of the associated gearwheel.

Further features of the invention appear from the following description of an embodiment of the invention given by way of example only and with reference to the drawings, in which:

FIG. 1 is a schematic end view of an internal combustion engine fitted with a balancer arrangement, FIG. 2 is a diagrammatic view of the mounting for a balancing wheel of the arrangement of FIG. 1 and FIG. 3 is a sectional side elevation of the engine of FIG. 1.

Referring to the drawings an internal combustion engine is shown which is intended for use in a motorcycle. The engine is generally of conventional construction having four cylinders (not shown) in line, each with an associated reciprocal piston 10. The pistons 10 are connected to a crankshaft 11 by connecting rods so that the crankshaft has 180° crank throws. Such an engine configuration is well known so will not be described further.

Such a four cylinder in line engine is conventionally used in automobiles and it is known to balance the primary out of balance forces in such engines. However in the illustrated engine in which the crankshaft 11 is connected to drive a spur gearwheel 12 which in turn directly drives a primary spur gearwheel 14 it is not convenient to incorporate balancer drives of the kind which are fitted in such automobiles. The illustrated engine is intended for motorcycles and when balancing such engines a different balancer drive arrangement is required.

Particular difficulties arise because of the high rotational speed of the engine when used for motorcycles in which speeds may be up to 11,000 rpm.

In order to meet the requirements of a secondary balancing arrangement the gearwheel 12 is arranged to be in mesh with the spur gear 15 of a balancing wheel 16 having half the number of teeth of gearwheel 12 so that the wheel 16 rotates at twice the rotational speed of the gearwheel 12 and, hence, the crankshaft 11.

A further balancing wheel 18 is arranged with its spur gear in mesh with the gearwheel 14 (which carries the clutch assembly 24) and the wheel 18 has half the number of teeth of the gearwheel 12 so that it rotates at the same rotational speed as the balancing wheel 16 but in the opposite direction.

Thus if the engine speed is at 11,000 rpm the balancing wheels 16 and 18 rotate at 22,000 rpm to balance the secondary forces which are of twice engine speed.

The balancing wheels 16 and 18 each include equal sized balancing weights 17 and 19 respectively of a magnitude according to the out of balance forces generated by the engine. The balancing weights 17 and 19 are, in the illustrated arrangement, shown in the positions adopted when the pistons 10 are in their bottom and top dead centre positions.

Since the balancing wheels 16 and 18 are intended for rotation at high speed it is desirable for the wheels to be adjustable so that the distance between the axis of rotation of the wheel 16 or 18 and the axis of the associated gearwheel 12 or 14 is adjustable. In this way backlash adjustment is possible and the balancing wheels 16 and 18 will run smoothly, even at high speed.

As illustrated, see particularly FIGS. 2 and 3, the wheels 16 and 18 are each mounted on a fixed spindle 20 which is anchored in relation to the crankcase 21. The wheels 16 and 18 are rotatable about a circular bearing surface 22 which lies eccentrically to the surface of the spindle 20. At one end of the spindle 20 is formed a diametral slot 23 for receiving a tool (not shown) whereby the spindle 20 is rotated to move the axis of rotation of the wheel relative to the axis of the spindle 20 and, accordingly, relative to the axis of the associated gearwheel 12 or 14. The maximum amount of adjustment is indicated in FIG. 2 by d.

It will be seen from FIG. 1 that the balancing wheels 16 and 18 are located at the opposite side of the crankshaft 11 to the pistons 10 and that the wheels are at either side and adjacent a plane P containing the central axes of the pistons 10. Moreover the wheel axes are parallel to the crankshaft axis.

By this arrangement two balancing wheels are provided which together are capable of meeting substantially all the secondary out of balance forces in a mechanically simple arrangement. The wheels are each capable of adjustment to reduce backlash and the wear characteristics of the wheels and of the transmission gearwheels from which they are driven are improved. Moreover the balancing arrangement can be accommodated without substantial revision of existing motorcycle drive arrangements which already include a primary gearwheel driven from a crankshaft gearwheel. The arrangement and adjustment of the balancing wheels enables a relatively economical kind of spur gear to be employed while still achieving substantial balance of the secondary forces in, at least, four cylinder motorcycle engines without noise or other problems which can otherwise arise with high speed engines.

What I claim as my invention and desire to secure by Letters Patent of the United States is:

1. A motorcycle internal combustion engine which comprises four in line pistons and associated cylinders; a crankshaft driven by reciprocation of the pistons in the cylinders; drive transmission means for transmitting drive from the crankshaft; and balancing means for balancing secondary forces generated by the engine; the drive transmission means including a crankshaft gearwheel concentrically rotatable with the crankshaft about the crankshaft axis, and a primary gearwheel in direct driving engagement with the crankshaft gearwheel and arranged to carry drive clutch means; the balancing means including a first balancing wheel in direct engagement with the crankshaft gearwheel and a second balancing wheel in direct engagement with the primary gearwheel, whereby the balancing wheels are driven in opposite directions at twice the rotational speed of the crankshaft about axes parallel to the crankshaft axis; and further comprising adjustment means for each balancing wheel whereby the distance between the axis of rotation of the respective balancing wheel and the axis of rotation of its associated gearwheel is adjustable independently of the other balancing wheel.

2. An engine according to claim 1 wherein the gearwheels are each spur gears meshing with spur gears on the respective balancing wheels, the balancing wheel gears each having half the number of teeth of the first gearwheel.

3. An engine according to claim 1 wherein the balancing wheels are each carried on a fixed spindle and, located between the spindle and the wheel, a bearing member for the wheel is eccentrically-arranged so that its position can be adjusted about the spindle to vary the distance between the axis of rotation of the balancing wheel and the axis of rotation of the associated gearwheel.

4. An engine according to claim 3 wherein the spindle is formed with a slot at one end whereby the spindle is rotated to effect said adjustment of said distance.

5. An engine according to claim 1 characterised in that the balancing wheels are located at the opposite side of the crankshaft to the pistons and to either side of a plane containing the axes of the pistons.

* * * * *